United States Patent [19]

Sasaki et al.

[11] Patent Number: 4,826,802
[45] Date of Patent: May 2, 1989

[54] METHOD FOR PREPARATION OF ANTIMONY AND TELLURIUM-CONTAINING METAL OXIDE CATALYSTS

[75] Inventors: Yutaka Sasaki; Yoshimi Nakamura; Hiroshi Utsumi; Kunio Mori, all of Kanagawa, Japan

[73] Assignee: Nitto Chemical Industry Co., Ltd., Tokyo, Japan

[21] Appl. No.: 159,997

[22] Filed: Feb. 24, 1988

[30] Foreign Application Priority Data

Feb. 24, 1987 [JP] Japan .................................. 62-39068

[51] Int. Cl.$^4$ .......................... B01J 21/08; B01J 23/18; B01J 27/057
[52] U.S. Cl. ..................................... 502/206; 502/202; 502/204; 502/209; 502/211; 502/215
[58] Field of Search ............... 502/202, 204, 206, 209, 502/211, 215

[56] References Cited

U.S. PATENT DOCUMENTS

| | | | |
|---|---|---|---|
| 3,988,359 | 10/1976 | Saito et al. ...................... | 502/202 X |
| 4,374,758 | 2/1983 | Sasaki et al. ..................... | 502/215 |
| 4,377,500 | 3/1983 | Grasselli et al. ................. | 252/432 |
| 4,447,558 | 5/1984 | Sasaki et al. ..................... | 502/215 |

FOREIGN PATENT DOCUMENTS

| | | |
|---|---|---|
| 138447 | 4/1985 | European Pat. Off. . |
| 153077 | 8/1985 | European Pat. Off. . |
| 154408 | 9/1985 | European Pat. Off. . |
| 2073722 | 10/1981 | United Kingdom . |

*Primary Examiner*—W. J. Shine
*Attorney, Agent, or Firm*—Sughrue, Mion, Zinn, Macpeak & Seas

[57] ABSTRACT

A process for preparing an antimony/tellurium-containing metal oxide catalyst, comprising preparing a slurry containing an antimony compound, a polyvalent metal compound, and a silica support starting material selected from silica sol and mixtures of silica sol and white carbon, fumed silica or silica hydrogel, heating the slurry at a pH or 7 or less and a temperature of at least 40° C., mixing the above heat treated slurry with a tellurium solution which has been independently prepared by oxidizing metallic tellurium with hydrogen peroxide in the presence of the oxide, oxyacid or oxyacid salt of at least one metal selected from the group consisting of vanadium, molybdenum and tungsten, and then drying and calcining the resulting mixture.

5 Claims, No Drawings

METHOD FOR PREPARATION OF ANTIMONY AND TELLURIUM-CONTAINING METAL OXIDE CATALYSTS

FIELD OF THE INVENTION

The present invention relates to a method for preparation of antimony and tellurium-containing metal oxide catalysts. More particularly, it is concerned with a method for preparing antimony and tellurium-containing metal oxide catalysts having high activity and good physical properties which are useful in the oxidation reaction of organic compounds.

The oxidation reaction of organic compounds as used herein includes as well as the usual oxidation reaction an oxidation reaction accompanied by dehydrogenation (oxidative dehydrogenation reaction) and an ammoxidation reaction. The organic compounds include olefinic hydrocarbons, alcohols, aldehydes, alkyl-substituted aromatic hydrocarbons and so on.

BACKGROUND OF THE INVENTION

It is known that antimony-containing metal oxide catalysts, more specifically catalysts comprising the oxides of antimony and at least one metal selected from iron, cobalt, nickel, tin, uranium, chromium, copper, manganese, titanium and cerium are useful in production of aldehydes and acids through the oxidation of organic compounds, in production of dienes, unsaturated aldehydes and unsaturated acids through the oxidative dehydrogenation, and in production of nitriles through ammoxidation. For example, Japanese Patent Publication No. 19111/63 and U.S. Pat. No. 4,377,500 discloses a catalyst comprising the oxides of antimony and iron, cobalt or nickel as a catalyst useful in production of acrylonitrile through ammoxidation of propylene; U.S. Pat. No. 3,152,170 discloses a catalyst comprising the oxides of antimony and tin; U.S. Pat. No. 3,308,151 discloses a catalyst comprising the oxides of antimony and uranium; and U.S. Pat. No. 3,200,081 discloses a catalyst comprising the oxides of antimony and manganese or copper.

Attempts to improve the above catalysts by adding other components have been made. For example, catalyst compositions prepared by adding the oxide of at least one element selected from vanadium, molybdenum and tungsten, and tellurium to each of the oxides of antimony and iron, the oxides of antimony and tin, and the oxides of antimony and uranium are proposed in Japanese Patent Publication Nos. 40958/72 and 19764/72, and U.S. Pat. No. 3,668,147 as multiple acceleration antimony polyvalent metal oxide catalysts.

These antimony-containing metal oxide catalysts, however, have disadvantages in that catalyst production reproducibility is poor, a catalyst having good strength is difficult to obtain, and efficiency in the catalyst production is low. With regard to improvements in the method of preparation thereof, several proposals have been made, as described in, for example, Japanese Patent Publication Nos. 3456/71 and 3457/71, and U.S. Pat. Nos. 3,341,471, 3,657,155 and 3,686,138.

However, various problems in these methods need to be overcome in that catalyst activity and physical properties are both unsatisfactory, or in reproducibility. Furthermore, those catalysts are unsatisfactory in respect of the yield of the desired product.

As a method for preparing a tellurium-containing stable solution, U.S. Pat. No. 4,374,758 discloses a method in which metallic tellurium is reacted with hydrogen peroxide using, as a reaction accelerating agent, the oxide, oxyacid or oxyacid salt of at least one metal selected from the group consisting of vanadium, molybdenum and tungsten. Moreover, a method for preparing catalysts using the above tellurium-containing stable solution is disclosed therein. In accordance with this method, a metal oxide composition containing as essential components antimony and at least one element selected from the group consisting of iron, cobalt, nickel, manganese, uranium, tin and copper is calcined at a temperature of about 500° to 1,000° C., the calcined oxide composition thus obtained is then impregnated with a tellurium-containing solution as described above, dried and again calcined at a temperature of about 400° to 850° C. to obtain the desired antimony and tellurium-containing metal oxide catalyst. Although this method is a good method for preparation of catalysts having high activity and good physical properties, the process is complicated. Thus, a more convenient method is desired for industrial use.

Catalysts containing antimony and tellurium have been produced by the above known antimony-containing metal oxide catalyst preparation methods. In accordance with these methods, however, an antimony-containing metal oxide catalyst with both satisfactory activity and physical properties is difficult to produce with good reproducibility. Moreover, as a result of the tellurium component, the problem, particularly with physical properties is more extended. That is, the catalyst particle density and the catalyst strength are decreased, and moreover, the reproducibility is reduced by an increase in viscosity particularly at the time of pH adjustment during the process of preparation of the catalyst.

Particularly, when a tellurium-containing stable solution prepared by reacting metallic tellurium and hydrogen peroxide using, as a reaction accelerating agent, the oxide, oxyacid or oxyacid salt of at least one metal selected from the group consisting of vanadium, molybdenum and tungsten as described in U.S. Pat. No. 4,374,758 is merely employed as the starting material for the tellurium component in slurry preparation (mixing and pH adjustment) in the methods as described in U.S. Pat. Nos. 3,657,155 and 3,686,138, etc. the above problem tends to be enhanced.

As described above, an antimony and tellurium-containing metal oxide catalyst with both excellent activity and physical properties is difficult to produce conveniently and with good reproducibility by conventional techniques.

SUMMARY OF THE INVENTION

An object of the present invention is to overcome the aforementioned defects of the conventional techniques and to provide a technique whereby an antimony and tellurium-containing metal oxide catalyst with both excellent activity and physical properties with good reproducibility can be produced advantageously from technical and economical standpoints.

Another object of the present invention is to produce an antimony and telluium-containing metal oxide catalyst for use in a fluidized bed, which is both excellent in activity and physical properties.

It has now been found that an antimony and tellurium-containing metal oxide catalyst good in both activity and physical properties can be produced with good reproducibility by modifying the type of the starting material for the tellurium component and the method of addition thereof at the step of preparation of the catalyst. On these findings, the present invention has been completed.

That is, the present invention provides a process for preparing an antimony and tellurium-containing metal oxide catalyst comprising the steps of drying an aqueous slurry containing an antimony compound, a tellurium compound, a polyvalent metal compound and a silica support starting material as essential components and calcining the solid thus formed, and more specifically which comprises preparing (i) a slurry containing an antimony compound, at least one polyvalent metal compound and a silica support starting material selected from the group consisting of silica sol and a mixture of silica sol and white carbon, fumed silica or silica hydrogel, and heating the slurry at a pH of 7 or less at a temperature of at least 40° C. to prepare a heat treated slurry, and independently, (ii) a tellurium-containing solution by oxidizing metallic tellurium with hydrogen peroxide in the presence of the oxide, oxyacid or oxyacid salt of at least one metal selected from the group consisting of vanadium, molybdenum and tangsten;

mixing the above components (i) and (ii);
drying the mixture; and
calcining the dried mixture.

DETAILED DESCRIPTION OF THE INVENTION

As the antimony and telurium-containing catalyst to be produced by the present invention, many catalysts can be chosen. Those represented by the following empirical formula are preferred.

$$Me_aSb_bTe_cX_dQ_eR_fO_g(SiO_2)_h$$

wherein

Me=at least one element selected from the group consisting of Fe, Co, Ni, Sn, U, Cr, Cu, Mn, Ti and Ce.

X=at least one element selected from the group consisting of V, Mo and W.

Q=at least one element selected from the group consisting of Li, Na, K, Rb, Cs, Be, Mg, Ca, Sr, Ba, Y, La, Zr, Th, Hf, Nb, Ta, Re, Ru, Os, Rh, Ir, Pd, Pt, Ag, Zn, Cd, Al, Ga, In, Tl, Ge, Pb, As and Se (preferably at least one element selected from the group consisting of Li, Na, K, Mg, Zr, Nb, Ta, Ag, Zn and Al).

R=at least one element selected from the group consisting of B, P and Bi,

The symbols a, b, c, d, e, f and g each represent an atomic ratio and are in the following ranges:

a=5 to 15 (preferably 7 to 13),
b=5 to 100 (preferably 10 to 50),
c=0.1 to 10 (preferably 0.1 to 8),
d=0 to 15 (preferably 0.05 to 5),
e=0 to 50 (preferably 0 to 10),
f=0 to 10 (preferably 0 to 8),
g=number corresponding to the oxides formed by the above components,
h=10 to 200 (preferably 20 to 200).

This catalyst can be used in both the fixed bed and the fluidized bed. It is particularly preferred that the catalyst be used in the fluidized bed. In this case, it is preferred that in the aforementioned catalyst composition formula, h=20 to 200.

In connection with the starting materials for the catalyst, antimony trioxide, antimony tetraoxide, antimonic acid, polyantimonic acid and the like can be used as the antimony component.

The oxides, hydrates, nitrates and so on of each element can be used as the Me component starting material.

Silica sol is advantageously used as the silica support starting material. 70% by weight or less, preferably 60% by weight or less, based on the total silica component of white carbon, fumed silica, silica hydrogel and the like can also be used in combination with the silica sol.

White carbon, fumed silica, silica hydrogel and the like are described in *Kagaku Binran, Oyo Kagaku Hen, I Process* edited by Nippon Kagaku Kai, Maruzen (1986), pp. 257–258, *Kirk-Othmer Encyclopedia of Chemical Technology*, Third Edition, Volume 17, p. 812, Volume 20, pp. 774 to 776 (1982), etc. The particle diameter of the ultimate silica particles is of the order of colloidal size, generally about 1 to about 1,000 mμ.

Metallic tellurium, tellurium dioxide, tellurium trioxide, tellurious acid, telluric acid and the like have heretofore been used as the tellurium component starting material, and they can also be used in the present invention. There has been employed a method in which the above compound is initially mixed with an antimony compound, a polyvalent metal compound and silica sol, the pH of the resulting mixture is adjusted, and the mixture is heated and spray dried. In the present invention, part of the tellurium component may be added using this method. However, the amount of the tellurium component added by the present invention is such that at least 30 atomic % is a tellurium containing solution as obtained by oxidizing metallic tellurium with hydrogen peroxide in the presence of the oxide, oxyacid or oxyacid salt of at least one metal selected from the group consisting of vanadium, molybdenum and tungsten.

Vanadium pentoxide, molybdenum trioxide, tungsten trioxide, vanadic acid, molybdic acid, tungstic acid, ammonium metavanadate, ammonium para or metamolybdate, ammonium para or metatungstate phosphomolybdic acid, silicamolybdic acid, phosphotungstic acid, selicatungstic acid and the like can be used. As the oxide, oxyacid or oxyacid salt of at least one metal selected from the group consisting of vanadium, molybdenum and tungsten. It is particularly convenient to use compounds having a high solubility in water.

In connection with the X component, the same compounds as used as oxyacids at the time of oxidation of metallic tellurium with hydrogen peroxide can be used. The amount of the oxyacid used in the oxidation of metallic tellurium with hydrogen peroxide is such that the atomic ratio of X/Te is in the range of about 0.01:1 to about 1:1. Therefore, the X component starting material in excess of the necessary amount for the oxidation of metallic tellurium with hydrogen peroxide can be added independently from the solution resulting from the oxidation of metallic tellurium with hydrogen peroxide.

In the case of Li, Na, K, Mg, Ag, Zn, Al, etc., the Q component can be selected appropriately from the oxides, hydroxides, nitrates and so on of the metals. In the case of Zr, its oxynitrate, oxide and so on can be used. In the case of Nb and Ta, their oxides, oxyacids, oxalate and so on can be used.

In connection with the R component, B is used in the form of the oxide or as the orthoboric acid, P is used in the form of oxide, or as metaphosphoric acid or orthophosphoric acid, and Bi is used in the form of oxide, nitrate, carbonate, or organic acid salts.

In accordance with the present invention, first, (i) a slurry containing an antimony compound, a polyvalent metal compound and a silica support starting material selected from silica sol and a mixture of silica sol and white carbon, fumed silica or silica hydrogel is prepared, and this slurry is heated at a pH of 7 or less (preferably 4 or less, more preferably 1 to 4). At a temperature of at least 40° C. (preferably 40° to 150° C., more preferably 80° to 110° C.) to prepare a heat treated slurry. This preparation method is preferably carried out by the method described in U.S. Pat. Nos. 3,657,155 and 3,686,138. Independently, (ii) a tellurium-containing solution is prepared by oxidizing metallic tellurium with hydrogen peroxide in the presence of the oxide, oxyacid or oxyacid salt of at least one metal selected from the group consisting of vanadium, molybdenum and tungsten. This preparation method is preferably carried out by the method described in U.S. Pat. No. 4,374,758. Then the components (i) and (ii) are mixed and subsequently dried and calcined to obtain the desired catalyst. Where a fluidized bed catalyst is produced, drying is generally carried out by the use of a spray dryer. Calcining is preferably carried out at a temperature of 500° to 950° C. for 0.1 to 100 hours.

The catalyst of the present invention can be used in the oxidation, oxidative dehydrogenation, ammoxidation and so on of organic compounds such as olefinic hydrocarbons, alcohols, aldehydes and alkyl-substituted aromatic hydrocarbons as disclosed in U.S. Pat. Nos. 3,716,496, 3,988,359, 4,000,176, 4,370,279, and 4,461,752. Conditions under which the catalyst is used in the above reactions are not critical and can be determined appropriately by those skilled in the art.

In the conventional methods of preparation, white carbon fumed silica, silica hydrogel and the like are difficult to use because of the marked reduction in the catalyst strength. On the other hand, these compounds can be used easily in the present invention.

The method of preparation of this invention is industrially advantageous over, for example, the impregnation catalyst preparation method using the tellurium containing solution in that the steps are short, operability and reproducibility are improved.

Although the exact mechanism by which the results as described above are obtained using the catalyst of the present invention is not clear, it is believed that the method of the present invention makes the three dimensional structure of particles in the slurry before spray drying more dense than that obtained by the conventional method.

The present invention is described in greater detail with reference to the following examples. Unless otherwise indicated, all parts, percents, ratios and the like are by weight.

The strength of the catalyst for fluidized bed was tested by the following two methods.

(1) Attrition Resistance Test

This was performed according to the method described in "Test Methods for Synthetic Cracking Catalysts" American Cyanamid Co., Ltd., 6/31-4m-1/57, known as a test method for a fluidized catalytic cracking catalyst.

The attrition loss (%) was determined according to the following relationship:

$$\text{Attrition Loss (\%) } R = \frac{B}{C - A} \times 100$$

where:

A = Weight of catalyst loss by attrition in 0 to 5 hours (g),

B = Weight of catalyst lost by attrition in 5 to 20 hours (g),

C = Weight of catalyst used in the test (g).

This test was performed at C = 50.

As the attrition resistance of the catalyst increases, the attrition loss (%), R value, decreases.

(2) Fracture Strength Test

Catalyst particles in the range of 35 to 40 microns were collected by the use of a micro mesh sieve. 0.025 g of the particles were placed in a 4-milli-liter volume cylindrical vessel of polystyrene along with steel balls, each 2 mm in diameter, and crushed for 90 seconds by the use of a mixer mill (manufactured by SPEX Corp.).

The particle diameter distribution of the sample after the fracture was measured, and the ratio of the amount of particles having a diameter of not more than 16 microns as a result of the fracture to the amount of particles charged, K (%), was determined.

As the strength of the catalyst increases, the K value decreases.

(3) Activity Test

The activity test of the fluidized bed catalyst was performed using the ammoxidation reaction of propylene as a typical example.

The catalyst was charged in a fluidized bed reactor in which the inner diameter of the catalyst fluidized portion was 2.5 cm and the height was 40 cm, and a gas having the following composition was introduced.

The reaction pressure was atmospheric.

Oxygen (introduced as air)/propylene = 2.2/1 (mol/mol)
Ammonia/propylene = 1.1/1 (mol/mol)

$$\text{Yield (\%)} = \frac{\text{Weight of Carbon in Desired Product Formed (g)}}{\text{Weight of Carbon in Organic Compound Starting Material Supplied (g)}} \times 100$$

$$\text{Conversion (\%)} = \frac{\text{Weight of Carbon in Organic Compound Starting Material Consumed in the Reaction (g)}}{\text{Weight of Carbon in Organic Compound Starting Material Supplied (g)}} \times 100$$

$$\text{Selectivity (\%)} = \frac{\text{Weight of Carbon in Desired Product Formed (g)}}{\text{Weight of Carbon in Organic Compound Starting Material Consumed in the Reaction(g)}} \times 100$$

EXAMPLE 1

A catalyst having the empirical formula $Fe_{6.6}Cu_{2.4}Sb_{15}Te_{0.9}Mo_{0.3}W_{0.15}O_{45.5}(SiO_2)_{36}$ was prepared as follows:

0.59 l of nitric acid (specific gravity 1.38) was mixed with 0.74 l of pure water and heated. 73.0 g of electrolytic iron powder was added in small portions. It was confirmed that the iron powder was completely dissolved. 115 g of copper nitrate was added to the above iron nitrate solution and dissolved therein. To this iron and copper solution was added 2,142 g of silica sol (SiO$_2$, 20% by weight). 433 g of antimony trioxide was added to the above solution to form a slurry. 7.8 g of ammonium para-tungstate was dissolved in 500 ml of pure water and added to the above slurry. The pH of the slurry was adjusted to 2 by adding 15% aqueous ammonia in small portions. After the pH adjustment, the temperature was raised and the mixture was heated under reflux at 100° C. for 5 hours.

Separately, 10.5 g of ammonium para-molybdate was dissolved in 100 g of pure water, and 22.7 g of metallic tellurium powder was added thereto. The mixture was heated to 90° C. with stirring and 35% hydrogen peroxide (aq. soln.) was added to dissolve the metallic tellurium powder.

The tellurium-containing solution thus prepared was added to the above slurry subjected to the heat treatment, and the resulting mixture was thoroughly stirred and spray dried. Spherical particles obtained by spray drying were calcined at 200° C. for 4 hours and at 400° C. for 4 hours, and finally at 775° C. for 4 hours.

EXAMPLE 2

A catalyst having the empirical formula Fe$_{6.6}$Cu$_{2.4}$Sb$_{15}$Te$_{0.84}$Mo$_{0.3}$W$_{0.12}$O$_{45.2}$(SiO$_2$)$_{36}$ was prepared in the same manner as in Example 1. The tellurium-containing solution was prepared as follows:

10.5 g of ammonium para-molybdate was dissolved in 100 g of pure water, and 21.2 g of metallic tellurium powder was added thereto. The resulting mixture was heated to 90° C. with stirring, and 35% hydrogen peroxide (aq. soln.) was dropped therein to dissolve the metallic tellurium powder.

EXAMPLE 3

A catalyst having the empirical formula Fe$_{7.8}$Cu$_{2.1}$Sb$_{15}$Te$_{0.84}$Mo$_{0.24}$W$_{0.24}$O$_{46.9}$(SiO$_2$)$_{36}$ was prepared in the same manner as in Example 1. The tellurium-containing solution was prepared as follows:

10.5 g of ammonium para-tungstate, 7.1 g of ammonium para-molybdate and 18.0 g of metallic tellurium were added to 200 ml of pure water and heated to 90° C., and 35% hydrogen peroxide (aq. soln.) was dropped thereto to dissolve them.

EXAMPLE 4

A catalyst having the same empirical formula as in Example 3 was prepared as follows:

73.0 g of electrolytic iron powder was added to 0.59 l of nitric acid (specific gravity 1.38) in small portions. It was confirmed that the iron powder was completely dissolved. 85.0 g of copper nitrate was weighed and added to the above nitric acid solution to dissolve therein. To this iron and copper solution was added 906 g of silica sol (SiO$_2$ 20% by weight). 700 ml of pure water was added, and the resulting mixture was stirred. To this mixture was added 181 g of fumed silica (Aerosil 380 manufactured by Nippon Aerosil Co., Ltd.). After it was confirmed that the fumed silica was uniformly distributed in the water, 366 g of antimony trioxide was added to form a slurry. 10.5 g of ammonium para-tungstate was dissolved in 500 ml of pure water, and the resulting solution was mixed with the above slurry. The pH of this slurry was adjusted to 2 by dropping 15% aqueous ammonia while well stirring the slurry. After the pH adjustment, the slurry was heated and subjected to a heat treatment at 95° C. for 6 hours.

Separately, 7.1 g of ammonium para-molybdate was dissolved in 130 ml of pure water, and 18.0 g of metallic tellurium powder was added thereto. The resulting mixture was heated to 90° C. with stirring, and 35% hydrogen peroxide (aq.soln.) was dropped in small portions to dissolve the tellurium.

The tellurium-containing solution thus prepared was added to the above slurry subjected to the heat treatment, and the resulting mixture was spray dried while stirring the mixture well. It was calcined at 200° C. for 2 hours and at 500° C. for 3 hours, and finally at 795° C. for 4 hours.

EXAMPLE 5

A catalyst having the same empirical formula as in Example 3 was prepared as follows:

0.59 l of nitric acid (specific gravity 1.38) was mixed with 0.74 l of pure water and the resulting mixture was heated. 73.0 g of electrolytic iron powder was added thereto in small portions. It was confirmed that the iron powder was completely dissolved. 85.0 g of copper nitrate was added to the above iron nitrate solution to dissolve therein. To this iron and copper solution were added 906 g of silica sol (SiO$_2$ 20% by weight) and further 906 g of silica hydrogel slurry (SiO$_2$ 20% by weight), and the resulting mixture was thoroughly stirred. 366 g of antimony trioxide was added to form a slurry. 10.5 g of ammonium para-tungstate was dissolved in 600 ml of pure water and added to the above slurry. This slurry was adjusted to pH 2 by adding 15% aqueous ammonia (aq. soln.) in small portions. After the pH adjustment, the mixture was heated under reflux at 98° C. for 5 hours.

Separately, 7.1 g of ammonium para-molybdate was dissolved in 130 ml of pure water, and 18.0 g of metallic tellurium powder was added thereto. The resulting mixture was heated to 90° C. with stirring and 35% hydrogen peroxide (aq. soln.) was dropped in small portions to dissolve the tellurium.

The tellurium-containing solution thus prepared was added to the above slurry subjected to the heat treatment, and the resulting mixture was spray dried while stirring the mixture well. It was then calcined at 200° C. for 2 hours and 400° C. for 2 hours, and finally at 790° C. for 5 hours.

COMPARATIVE EXAMPLE 1

A catalyst having the same empirical formula as in Example 1 was prepared as follows:

0.59 l of nitric acid (specific gravity 1.38) was mixed with 0.74 l of pure water, and the resulting mixture was heated. 73.0 g of electrolytic iron powder was added in small portions. It was confirmed that the iron powder was completely dissolved. 22.7 g of metallic tellurium powder was added and dissolved. 115 g of copper nitrate was added to the above iron nitrate solution to dissolve therein. To this iron, tellurium and copper solution was added 2,142 g of silica sol (SiO$_2$ 20% by weight). 433 g of antimony trioxide was added to the above solution to form a slurry. 7.8 g of ammonium paratungstate was dissolved in 500 ml of pure water, and then 10.5 g of ammonium para-molybdate was dissolved therein. The resulting solution was added to the above slurry. The pH of this slurry was adjusted to 2 by adding 15% aqueous ammonium in small portions. After the pH adjustment, the slurry was heated under reflux at 100° C. for 5 hours. After the completion of the heat treatment, the slurry was spray dried while stirring the mixture well. Spherical particles obtained by spray drying were calcined at 200° C. for 4 hours and 400° C. for 4 hours and finally at 775° C. for 4 hours.

COMPARATIVE EXAMPLE 2

A catalyst having the same composition as in Example 2 was prepared in the same manner as in Example 2 with the exception that the tellurium-containing solution was added to the slurry prior to the pH adjustment. At the time of pH adjustment, the viscosity of the slurry increased and, therefore, the slurry could not be mixed well even though stirring was performed vigorously.

COMPARATIVE EXAMPLE 3

A catalyst having the same composition as in Example 3 was prepared in the same manner as in Example 3 with the exception that the tellurium-containing solution prepared in the same manner as in Example 3 was added after the addition of the silica sol. The pH adjustment was applied to the slurry containing the starting materials of all the components. At the time of the pH adjustment, the viscosity of the slurry increased and the operability was poor.

COMPARATIVE EXAMPLE 4

A catalyst having the same composition as in Example 4 was prepared in the same manner as in Example 4 with the exception that the tellurium-containing solution separately prepared was added after the addition of the antimony trioxide. That is, the pH adjustment was applied to the slurry containing the starting materials of all the components. At the time of the pH adjustment, the viscosity of the slurry increased and the operability was poor.

COMPARATIVE EXAMPLE 5

A catalyst having the same composition as in Example 5 was prepared by the same manner as in Example 5 with the exception that the tellurium-containing solution separately prepared was added after the addition of the antimony trioxide. At the time of the pH adjustment, the viscosity of the slurry increased, and the slurry was difficult to stir. Thus, pure water was added to dilute the slurry, and the slurry thus diluted was stirred. However the diluted slurry was still poor in operability.

COMPARATIVE EXAMPLE 6

A catalyst having the same empirical formula as in Example 1 was prepared as described below according to the method described in U.S. Pat. No. 4,374,758.

0.59 l of nitric acid (specific gravity 1.38) was mixed with 0.74 l of pure water and the resulting mixture was heated. 73.0 g of electrolytic iron powder was added thereto in small portions. It was confirmed that the iron powder was completely dissolved. 115 g of copper nitrate was added to the above iron nitrate solution to dissolve therein. To this iron and copper solution was added 2,142 g of silica sol ($SiO_2$ 20% by weight). 433 g of antimony trioxide was added to the above solution to form a slurry. 7.8 g of ammonium para-tungstate was dissolved in 500 ml of pure water and added to the above slurry. The pH of the slurry was adjusted to pH 2 by adding 15% aqueous ammonia in small portions. After the pH adjustment, the slurry was heated under reflux at 100° C. for 5 hours. This slurry was spray dried, and the spherical particles thus obtained were calcined at 200° C. for 4 hours and 400° C. for 4 hours, and finally at 775° C. for 4 hours. The base catalyst was thus prepared.

Separately, 10.5 g of ammonium para-molybdate was dissolved in 100 g of pure water and 22.7 g of metallic tellurium powder was added thereto. The resulting mixture was heated to 90° C. with stirring, and 35% hydrogen peroxide (aq. soln.) was added to dissolve the metallic tellurium.

The base catalyst as prepared above was impregnated with the tellurium-containing solution thus prepared, and then dried at 130° C. for 16 hours and calcined at 200° C. for 4 hours and 400° C. for 4 hours and finally at 700° C. for 4 hours.

With regard to the apparent bulk density of the catalyst, 1.12 (g/ml), the R value and K value were 0.7% and 39.7%, respectively.

The activity test was performed in the same manner as in Example 1. The acrylonitrile yield was 82.2%; the propylene conversion was 99.0%; and the acrylonitrile selectivity was 83.0%.

The results of the activity test and measurement of physical properties of the catalysts of the above Examples and Comparative Examples are shown in Table 1 below.

TABLE 1

| Run No. | Catalyst Formulation (Atomic Ratio) | Tellurium-Containing Solution | Order of Addition of Tellurium-Containing Solution | Calcining of Catalyst Temperature (°C.) | Calcining of Catalyst Time (hrs) | Apparent Bulk Density (g/ml) | Strength R Value (%) | Strength K Value (%) |
|---|---|---|---|---|---|---|---|---|
| Example 1 | $Fe_{6.6}Cu_{2.4}Sb_{15}Te_{0.9}Mo_{0.3}W_{0.15}O_{45.5}(SiO_2)_{36}$ | Ammonium para-molybdate/Te/$H_2O_2$ | After heat treatment of slurry | 775 | 4 | 1.16 | 0.5 | 32.1 |
| Example 2 | $Fe_{6.6}Cu_{2.4}Sb_{15}Te_{0.84}Mo_{0.3}W_{0.12}O_{45.2}(SiO_2)_{36}$ | Ammonium para-molybdate/Te/$H_2O_2$ | After heat treatment of slurry | 780 | 4 | 1.06 | 0.5 | 35.4 |
| Example 3 | $Fe_{7.8}Cu_{2.1}Sb_{15}Te_{0.84}Mo_{0.24}W_{0.24}O_{46.9}(SiO_2)_{36}$ | Ammonium para-tungstate ammonium para-molybdate/Te/$H_2O_2$ | After heat treatment of slurry | 795 | 4 | 1.13 | 0.3 | 27.5 |
| Example 4 | Same as in Example 3 (using Aerosil 380) | Ammonium para-molybdate/Te/$H_2O_2$ | After heat treatment of slurry | 795 | 4 | 0.95 | 0.9 | 37.9 |
| Example 5 | Same as in Example 3 (using silica hydrogel) | Ammonium para-molybdate/Te/$H_2O_2$ | After heat treatment of slurry | 790 | 5 | 0.97 | 1.0 | 39.2 |
| Comparative Example 1 | Same as in Example 1 | Tellurium nitrate | Before heat treatment of slurry | 775 | 4 | 0.98 | 2.0 | 42.6 |
| Comparative Example 2 | Same as in Example 2 | Ammonium para-molybdate/Te/$H_2O_2$ | Before heat treatment of slurry | 780 | 4 | 1.05 | 2.4 | 40.4 |

TABLE 1-continued

| | | | | | | | |
|---|---|---|---|---|---|---|---|
| Comparative Example 3 | Same as in Example 3 | Ammonium para-tungstate ammonium para-molybdate/Te/H$_2$O$_2$ | Before heat treatment of slurry | 795 | 4 | 1.09 | 3.0 | 39.6 |
| Comparative Example 4 | Same as in Example 4 | Ammonium para-molybdate/Te/H$_2$O$_2$ | Before heat treatment of slurry | 795 | 4 | 0.88 | 3.2 | 52.1 |
| Comparative Example 5 | Same as in Example 5 | Ammonium para-molybdate/Te/H$_2$O$_2$ | Before heat treatment of slurry | 790 | 5 | 0.90 | 4.1 | 53.5 |
| Comparative Example 6 | Same as in Example 1 | Ammonium para-molybdate/Te/H$_2$O$_2$ | Impregnation of the base catalyst | 700 | 4 | 1.12 | 0.7 | 39.7 |

| | Catalyst Activity | | | |
|---|---|---|---|---|
| | Reaction Conditions | | Reaction Results (%) | |
| Run No. | Temperature (°C.) | Contact Time (sec) | Acrylonitrile Yield (%) | Propylene Conversion (%) | Acrylonitrile Selectivity (%) |
| Example 1 | 435 | 4 | 83.2 | 98.7 | 84.3 |
| Example 2 | 435 | 4 | 83.3 | 98.0 | 85.0 |
| Example 3 | 435 | 3.5 | 82.9 | 98.3 | 84.3 |
| Example 4 | 440 | 3.5 | 83.2 | 97.2 | 85.6 |
| Example 5 | 440 | 3.5 | 83.3 | 97.6 | 85.3 |
| Comparative Example 1 | 435 | 4 | 81.8 | 98.5 | 83.0 |
| Comparative Example 2 | 435 | 4 | 76.2 | 97.2 | 78.4 |
| Comparative Example 3 | 435 | 3.5 | 77.5 | 97.5 | 79.5 |
| Comparative Example 4 | 440 | 3.5 | 75.9 | 97.0 | 78.2 |
| Comparative Example 5 | 440 | 3.5 | 76.8 | 97.2 | 79.0 |
| Comparative Example 6 | 435 | 4 | 82.2 | 99.0 | 83.0 |

EXAMPLE 6

A catalyst having the empirical formula of Fe$_{7.2}$Co$_{0.3}$Ni$_{0.3}$Cu$_{1.8}$Sb$_{15}$Te$_{0.9}$V$_{0.12}$Mo$_{0.3}$Li$_{0.12}$O$_{46.9}$ (SiO$_2$)$_{36}$ was prepared in the same manner as in Example 1 except that the nitrates of cobalt, nickel and lithium were used as the starting materials and their solutions were added to the iron and copper solution.

Ammonium metavanadate was used as the vanadium starting material, and it was added to the slurry before the pH adjustment. Metallic tellurium powder was used as the tellurium starting material, and it was suspended in an aqueous solution of ammonium para-molybdate and oxidized with hydrogen peroxide. The tellurium and molybdenum-containing solution thus obtained was added to the slurry after the heat treatment which had been prepared independently. The resulting mixture was thoroughly mixed and then spray dried, and calcined at 200° C. for 4 hours and 400° C. for 4 hours and finally at 780° C. for 4 hours.

EXAMPLE 7

A catalyst having the empirical formula of Fe$_{6.6}$Sn$_{0.6}$Cu$_{2.4}$Sb$_{15}$Te$_{0.96}$Mo$_{0.42}$W$_{0.06}$Na$_{0.06}$K$_{0.06}$P$_{0.18}$O$_{47.9}$(SiO$_2$)$_{36}$ was prepared in the same manner as in Example 6 except that tin powder was used as the starting material of the tin component, the nitrates of sodium and potassium were used as the starting material, and orthophosphoric acid was used as the phosphorus starting material.

EXAMPLE 8

A catalyst having the empirical formula of Fe$_{7.2}$Cu$_{1.8}$Mn$_{0.3}$Sb$_{15}$Te$_{0.9}$Mo$_{0.3}$W$_{0.12}$Mg$_{0.6}$Bi$_{0.12}$O$_{47.0}$ (SiO$_2$)$_{36}$ was prepared in the same manner as in Example 5 except that the nitrates of manganese, magnesium and bismuth were used as the starting materials.

Silica hydrogel was used as in Example 5 as a half of the silica starting material.

EXAMPLE 9

A catalyst having the empirical formula of Fe$_{7.2}$Cu$_{1.8}$Ti$_{0.3}$Ce$_{0.3}$Sb$_{15}$Te$_{0.9}$V$_{0.06}$Mo$_{0.36}$Zr$_{0.72}$B$_{0.3}$O$_{81.2}$ (SiO$_2$)$_{36}$ was prepared in the same manner as in Example 1 except that titanium dioxide was used as the titanium starting material, cerium nitrate was used as the cerium starting material, zirconium oxynitrate was used as the zirconium starting material, and orthoboric acid was used as the boron starting material.

Metallic tellurium powder was used as tellurium component starting material. It was suspended in a solution of ammonium metavanadate and ammonium para-molybdate and oxidized with hydrogen peroxide. The solution thus obtained was used.

EXAMPLE 10

A catalyst having the empirical formula of Fe$_{6.6}$Cu$_{2.4}$Sb$_{15}$Te$_{1.2}$V$_{0.12}$Mo$_{0.9}$Nb$_{0.06}$Ta$_{0.06}$P$_{0.12}$O$_{48.3}$ (SiO$_2$)$_{36}$ was prepared in the same manner as in Example 5 except that niobium pentoxide was used as the niobium starting material, tantalum pentoxide was used as the tantalum starting material, and orthophosphoric acid was used as the phorphorus starting material.

Metallic tellurium powder was used as the tellurium component starting material. This metallic tellurium powder was suspended in a solution of ammonium metavanadate and ammonium paramolybdate and oxidized with hydrogen peroxide. The solution thus obtained was added to the slurry after the heat treatment.

EXAMPLE 11

A catalyst having the empirical formula of Fe$_{6.6}$Mg$_{1.8}$Sb$_{15}$Te$_{1.02}$V$_{0.06}$Mo$_{0.36}$W$_{0.12}$Ag$_{0.06}$B$_{0.3}$O$_{45.8}$ (SiO$_2$)$_{30}$ was prepared in the same manner as in Example 1 except that the nitrates of magnesium and silver were used as these component starting materials, and orthoboric acid was used as the boron component starting material.

Metallic tellurium was used as the tellurium component starting material. This metallic tellurium was suspended in a solution of ammonium para-tugstate and ammonium para-molybdate and oxidized with hydrogen peroxide. The solution thus obtained was added to the slurry after the heat treatment which had been prepared independently.

EXAMPLE 12

A catalyst having the empirical formula of $Fe_{6.6}Cu_{2.4}Sb_{15}Te_{0.84}Mo_{0.3}W_{0.12}Zn_{0.3}P_{0.06}B_{0.3}O_{46.1}(SiO_2)_{33}$ was prepared in the same manner as in Example 11 except that zinc oxide was used as the zinc starting material, orthophosphoric acid was used as the phosphorus starting material, and orthoboric acid was used as the boron starting material.

EXAMPLE 13

A catalyst having the empirical formula of $Fe_{7.8}Ni_{0.15}Cu_{1.8}Sb_{15}Te_{0.87}Mo_{0.37}W_{0.24}P_{0.09}O_{47.1}(SiO_2)_{42}$ was prepared in the same manner as in Example 11 except that nickel nitrate was used as the nickel starting material, and orthophosphoric acid was used as the phorphorus component starting material.

EXAMPLE 14

A catalyst having the empirical formula of $Fe_{7.2}Cu_{1.8}Sb_{15}Te_{1.2}Mo_{0.6}W_{0.06}Al_{0.9}P_{0.12}O_{48.6}(SiO_2)_{33}$ was prepared in the same manner as in Example 5 except that aluminum nitrate was used as the aluminum starting material, and orthophosphoric acid was used as the phosphorus starting material.

Silica hydrogel was used as in Example 5 as a half of the silica starting material.

Metallic tellurium powder was used as the tellurium component. This metallic tellurium powder was suspended in a solution of ammonium para-tungstate and ammonium para-molybdate and oxidized with hydrogen peroxide. The solution thus obtained was added to the slurry after the heat treatment which had been prepared independently

EXAMPLE 15

A catalyst having the empirical formula of $Fe_6U_{1.8}Cr_{0.3}Sb_{15}Te_{0.84}Mo_{0.42}B_{0.3}O_{47.5}(SiO_2)_{30}$ was prepared in the same manner as in Example 1 except that uranyl nitrate was used as the uranium starting material, chromium nitrate was used as the chromium starting material, and boron trioxide was used as the boron starting material.

These catalysts were evaluated and the results obtained are shown in the table below.

TABLE 2

| Run No. | Catalyst Composition (atomic ratio) | Tellurium-Containing Solution | Order of Addition of Tellurium-Containing Solution | Catalyst Calcining Conditions Temperature (°C.) | Time (hr) |
|---|---|---|---|---|---|
| Example 6 | $Fe_{7.2}Co_{0.3}Ni_{0.3}Cu_{1.8}Sb_{15}Te_{0.9}V_{0.12}Mo_{0.3}Li_{0.23}O_{46.3}(SiO_2)_{36}$ | Ammonium paramolybdate/Te/$H_2O_2$ | After heat treatment of slurry | 780 | 4 |
| Example 7 | $Fe_{6.6}Sn_{0.6}Cu_{2.4}Sb_{15}Te_{0.96}Mo_{0.42}W_{0.06}Na_{0.06}K_{0.06}P_{7.18}O_{47.9}(SiO_2)_{36}$ | Ammonium paramolybdate/Te/$H_2O_2$ | After heat treatment of slurry | 760 | 4 |
| Example 8 | $Fe_{7.2}Cu_{1.8}Mn_{0.3}Sb_{15}Te_{0.9}Mo_{0.3}W_{0.12}Mg_{0.6}Bi_{0.12}O_{47.0}(SiO_2)_{36}$ | Ammonium paramolybdate/Te/$H_2O_2$ | After heat treatment of slurry | 785 | 4 |
| Example 9 | $Fe_{7.2}Cu_{1.8}Ti_{0.3}Ce_{0.3}Sb_{15}Te_{0.9}V_{0.06}Mo_{0.36}Zr_{0.72}B_{0.3}O_{81.2}(SiO_2)_{36}$ | Ammonium metavanadate.ammonium paramolybdate/Te/$H_2O_2$ | After heat treatment of slurry | 790 | 4 |
| Example 10 | $Fe_{6.6}Cu_{2.4}Sb_{15}Te_{1.2}V_{0.12}Mo_{0.9}Nb_{0.06}Ta_{0.06}P_{0.12}O_{48.3}(SiO_2)_{36}$ | Ammonium metavanadate.ammonium paramolybdate/Te/$H_2O_2$ | After heat treatment of slurry | 740 | 4 |
| Example 11 | $Fe_{6.6}Mg_{1.8}Sb_{15}Te_{1.02}V_{0.06}Mo_{0.36}W_{0.12}Ag_{0.06}B_{0.3}O_{45.3}(SiO_2)_{30}$ | Ammonium paramolybdate.ammonium paratungstate/Te/$H_2O_2$ | After heat treatment of slurry | 775 | 4 |
| Example 12 | $Fe_{6.6}Cu_{2.4}Sb_{15}Te_{0.84}Mo_{0.3}W_{0.12}En_{0.3}P_{0.06}B_{0.3}O_{46.1}(SiO_2)_{33}$ | Ammonium paramolybdate.ammonium paratungstate/Te/$H_2O_2$ | After heat treatment of slurry | 775 | 4 |
| Example 13 | $Fe_{7.8}Ni_{0.15}Cu_{1.8}Sb_{15}Te_{0.87}Mo_{0.27}W_{0.24}P_{0.09}O_{47.1}(SiO_2)_{42}$ | Ammonium paramolybdate.ammonium paratungstate/Te/$H_2O_2$ | After heat treatment of slurry | 795 | 4 |
| Example 14 | $Fe_{7.2}Cu_{1.8}Sb_{15}Te_{1.2}Mo_{0.6}W_{0.06}Al_{0.9}P_{0.12}O_{48.6}(SiO_2)_{33}$ | Ammonium paramolybdate.ammonium paratungstate/Te/$H_2O_2$ | After heat treatment of slurry | 760 | 4 |
| Example 15 | $Fe_6U_{1.8}Cr_{0.3}Sb_{15}Te_{0.84}Mo_{0.42}B_{0.3}O_{47.5}(SiO_2)_{30}$ | Ammonium paramolybdate/Te/$H_2O_2$ | After heat treatment of slurry | 780 | 4 |

| | Physical Properties of Catalyst | | | Catalyst Activity | | | | |
| | | | | Reaction Conditions | | Reaction Results | | |
| Run No. | Apparent Bulk Density (g/mol) | R Value (%) | K Value (%) | Temperature (°C.) | Contact Time (sec) | Acrilonitrile Yield (%) | Propylene Conversion (%) | Acrylonitrile Selectivity (%) |
|---|---|---|---|---|---|---|---|---|
| Example 6 | 1.15 | 0.6 | 35.0 | 440 | 3.5 | 83.3 | 98.0 | 85.0 |
| Example 7 | 1.14 | 0.7 | 35.5 | 435 | 4 | 83.0 | 97.7 | 85.0 |
| Example 8 | 0.96 | 1.0 | 38.9 | 440 | 3.5 | 83.6 | 98.1 | 85.2 |
| Example 9 | 1.16 | 0.5 | 32.0 | 440 | 3.5 | 82.9 | 98.2 | 84.4 |
| Example 10 | 0.97 | 1.1 | 39.3 | 430 | 4.5 | 83.4 | 97.8 | 85.3 |

TABLE 2-continued

| | | | | | | | | |
|---|---|---|---|---|---|---|---|---|
| Example 11 | 1.15 | 0.5 | 32.0 | 435 | 3.5 | 83.0 | 97.7 | 85.0 |
| Example 12 | 1.18 | 0.6 | 34.5 | 440 | 3.5 | 83.6 | 97.5 | 85.7 |
| Example 13 | 1.14 | 0.4 | 27.0 | 440 | 4 | 83.8 | 98.7 | 84.9 |
| Example 14 | 0.97 | 1.0 | 39.9 | 435 | 3.5 | 83.8 | 98.5 | 85.1 |
| Example 15 | 1.15 | 0.7 | 34.8 | 435 | 4.5 | 83.0 | 98.0 | 84.7 |

While the invention has been described in detail and with reference to specific embodiments thereof, it will be apparent to one skilled in the art that various changes and modifications can be made therein without departing from the spirit and scope thereof.

What is claimed is:

1. A process for preparing an antimony and tellurium-containing metal oxide catalyst comprising the steps of:
   (i) preparing a slurry containing an antimony compound; at least one polyvalent metal compound of at least one element selected from the group consisting of iron, cobalt, nickel, tin, uranium, chromium, copper, manganese, titanium and cerium; and a silica support starting material selected from the group consisting of silica sol and a mixture of silica sol and white carbon, fumed silica or silica hydrogel, and heating the slurry at a pH of 7 or less and at a temperature of at least 40° C. to form a heat slurry;
   (ii) independently preparing a solution comprising metallic tellurium oxidized with hydrogen peroxide in the presence of the oxide, oxyacid or oxyacid salt of at least one metal selected from the group consisting of vanadium, molybdenum and tungsten as a tellurium-containing solution;
   (iii) mixing components of (i) and (ii) above;
   (iv) drying the mixture; and
   (v) calcining the dried mixture.

2. The process as claimed in claim 1, wherein the antimony and tellurium-containing metal oxide catalyst has a formula represented by the following empirical formula:

$Me_a Sb_b Te_c X_d Q_e R_f O_g (SiO_2)_h$ wherein:
   Me = at least one element selected from the group consisting of Fe, Co, Ni, Sn, U, Cr, Cu, Mn, Ti and Ce,
   X = at least one element selected from the group consisting of V, Mo and W,
   Q = at least one element selected from the group consisting of Li, Na, K, Rb, Cs, Be, Mg, Ca, Sr, Ba, Y, La, Zr, Th, Hf, Nb, Ta, Re, Ru, Os, Rh, Ir, Pd, Pt, Ag, Zn, Cd, Al, Ga, In, Tl, Ge, Pb, As and Se,
   R = at least one element selected from the group consisting of B, P and Bi, and
   the symbols a, b, c, d, e, f and g indicate atomic ratios and are each in the following ranges:
   a = 5 to 15,
   b = 5 to 100,
   c = 0.1 to 10,
   d = 0 to 15,
   e = 0 to 50,
   f = 0 to 10,
   g = a number corresponding to the oxides formed by the above components,
   h = 10 to 200.

3. The process as claimed in claim 1, wherein the silica support starting material consists of silica sol.

4. The process as claimed in claim 1, wherein the silica support starting material is a mixture of 70% by weight or less, based on the total weight of the silica component, of white carbon, fumed silica or silica hydrogel and 30% by weight or more of silica sol.

5. The process as claimed in claim 1, wherein said antimony and tellurium-containing metal oxide catalyst is used for a fluidized bed reaction.

* * * * *